US011294566B2

(12) United States Patent
Huang et al.

(10) Patent No.: US 11,294,566 B2
(45) Date of Patent: Apr. 5, 2022

(54) METHOD, ELECTRONIC DEVICE AND COMPUTER PROGRAM PRODUCT FOR MANAGING DISKS

(71) Applicant: EMC IP Holding Company LLC, Hopkinton, MA (US)

(72) Inventors: Liang Huang, Shanghai (CN); Ruipeng Yang, Shan (CN); Xiaoliang Zhao, Roo (CN); Xianlong Liu, Shanghai (CN); Yunfei Chen, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 40 days.

(21) Appl. No.: 16/881,400

(22) Filed: May 22, 2020

(65) Prior Publication Data
US 2021/0132802 A1    May 6, 2021

(30) Foreign Application Priority Data

Oct. 30, 2019    (CN) .......................... 201911044969.8

(51) Int. Cl.
*G06F 3/06* (2006.01)
(52) U.S. Cl.
CPC .......... *G06F 3/0604* (2013.01); *G06F 3/0643* (2013.01); *G06F 3/0683* (2013.01)
(58) Field of Classification Search
CPC ..... G06F 3/0604; G06F 3/0643; G06F 3/0683
See application file for complete search history.

(56) References Cited

U.S. PATENT DOCUMENTS

| 8,745,327 | B1 * | 6/2014 | Throop ................. G06F 3/0689 |
| | | | 711/114 |
| 9,323,682 | B1 | 4/2016 | Marshak et al. |
| 9,477,431 | B1 * | 10/2016 | Chen ..................... G06F 3/0685 |
| 9,513,814 | B1 * | 12/2016 | Can ....................... G06F 3/0649 |
| 9,594,514 | B1 | 3/2017 | Bono et al. |
| 9,684,593 | B1 | 6/2017 | Chen et al. |
| 9,798,465 | B1 | 10/2017 | Labaj et al. |
| 10,013,196 | B2 | 7/2018 | Tylik et al. |
| 10,338,825 | B2 | 7/2019 | Dalmatov |
| 10,466,901 | B1 | 11/2019 | Labaj et al. |
| 10,552,342 | B1 | 2/2020 | Marshak et al. |
| 10,754,573 | B2 | 8/2020 | Dalmatov et al. |
| 10,809,931 | B1 * | 10/2020 | Martin .................. G06F 3/0689 |
| 11,144,222 | B2 | 10/2021 | Dalmatov et al. |

(Continued)

*Primary Examiner* — Ryan Bertram
(74) *Attorney, Agent, or Firm* — BainwoodHuang (57) ABSTRACT

Techniques for managing disks involve determining, based on a parameter related to a capability of a plurality of disks, a reference capability parameter for each of the plurality of disks. In addition, the techniques involve determining a used capability parameter for each of the plurality of disks. Moreover, the techniques involve determining from the plurality of disks a first disk to be adjusted, a used capability parameter of the first disk exceeds a reference capability parameter of the first disk. The techniques further involve causing data of at least one disk slice in the first disk to be moved to a second disk of the plurality of disks, such that a difference between the used capability parameter of the first disk and reference capability parameter of the first disk is below a predetermined threshold. Accordingly, a balanced operation among respective storage disks can be achieved.

20 Claims, 7 Drawing Sheets

(56) References Cited

U.S. PATENT DOCUMENTS

| | | | |
|---|---|---|---|
| 2008/0028049 A1* | 1/2008 | Taguchi | H04L 41/082 709/220 |
| 2012/0059994 A1* | 3/2012 | Montgomery | G06F 3/0685 711/119 |
| 2013/0232261 A1* | 9/2013 | Wright | H04L 41/5009 709/224 |
| 2015/0193154 A1* | 7/2015 | Gong | G06F 3/0608 711/103 |
| 2017/0220275 A1* | 8/2017 | Anzai | G06F 3/0619 |
| 2018/0300066 A1* | 10/2018 | Li | G06F 3/0653 |
| 2018/0321860 A1* | 11/2018 | Marchenko | G06F 12/08 |
| 2019/0220217 A1* | 7/2019 | Kimmel | G06F 3/0638 |
| 2019/0384521 A1* | 12/2019 | Patel | G06F 3/0653 |
| 2020/0026468 A1* | 1/2020 | Kang | G06F 3/0665 |
| 2020/0133535 A1* | 4/2020 | Ma | G06F 3/0689 |
| 2020/0133852 A1* | 4/2020 | Lv | G06F 12/0646 |
| 2020/0341637 A1* | 10/2020 | Shang | G06F 3/061 |
| 2021/0191619 A1* | 6/2021 | Dalmatov | G06F 3/0689 |

\* cited by examiner

METHOD, ELECTRONIC DEVICE AND COMPUTER PROGRAM PRODUCT FOR MANAGING DISKS

CROSS-REFERENCE TO RELATED APPLICATION

This application claims priority to Chinese Patent Application No. CN201911044969.8, on file at the China National Intellectual Property Administration (CNIPA), having a filing date of Oct. 30, 2019, and having "METHOD, ELECTRONIC DEVICE AND COMPUTER PROGRAM PRODUCT FOR MANAGING DISKS" as a title, the contents and teachings of which are herein incorporated by reference in their entirety.

FIELD

Embodiments of the present disclosure generally relate to the field of data storage, and more specifically, to a method, an electronic device and a computer program product for managing disks.

BACKGROUND

Fully automated storage tiering virtual pool (FAST VP) technology is used to automatically classify different types of data into various types of storage media in a tiered pool. To implement the FAST VP, for example, frequently accessed data or data of great importance may be moved to high-cost disks with fast speed and better performance while less accessed data or data of less importance may be moved to low-cost disks with slow speed and low performance. Accordingly, FAST VP can lower the total cost of ownership and boost the performance. However, the traditional FAST VP technology is only restricted to data movement between disk slices with the same IO heat (i.e., the number of reads/writes per unit of time) and worn-out level (i.e., the number of write requests). To further save resources, the number of movements should be further reduced.

SUMMARY

Embodiments of the present disclosure provide a method, an electronic device and a computer program product for managing disks.

In accordance with a first aspect of the present disclosure, there is provided a method of managing disks. The method comprises determining, based on a parameter related to a capability of a plurality of disks, a reference capability parameter for each of the plurality of disks. In addition, the method also comprises determining a used capability parameter for each of the plurality of disks. Moreover, the method comprises determining from the plurality of disks a first disk to be adjusted, where a used capability parameter of the first disk exceeds a reference capability parameter of the first disk. The method further comprises causing data of at least one disk slice in the first disk to be moved to a second disk of the plurality of disks, such that a difference between the used capability parameter of the first disk and reference capability parameter of the first disk is below a predetermined threshold.

In accordance with a second aspect of the present disclosure, there is provided an electronic device. The electronic device comprises: a processor; and a memory storing computer program instructions in the memory, the processor running the computer program instructions in the memory to control the electronic device to perform acts comprising: determining, based on a parameter related to a capability of a plurality of disks, a reference capability parameter for each of the plurality of disks; determining a used capability parameter for each of the plurality of disks; determining from the plurality of disks a first disk to be adjusted, where a used capability parameter of the first disk exceeds the reference capability parameter of the first disk; and causing data of at least one disk slice in the first disk to be moved to a second disk of the plurality of disks, such that a difference between the used capability parameter of the first disk and the reference capability parameter of the first disk is below a predetermined threshold.

In accordance with a third aspect of the present disclosure, there is provided a computer program product tangibly stored on a non-volatile computer-readable medium and including machine-executable instructions, which, when executed, cause a machine to perform steps of the method according to the first aspect.

BRIEF DESCRIPTION OF THE DRAWINGS

Through the following more detailed description of the example embodiments of the present disclosure with reference to the accompanying drawings, the above and other objectives, features, and advantages of the present disclosure will become more apparent, where the same reference sign usually refers to the same component in the example embodiments of the present disclosure.

In each drawing, same or corresponding signs represent same or corresponding parts.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Embodiments of the present disclosure will be described in more details with reference to the drawings. Although the drawings illustrate some embodiments of the present disclosure, it should be appreciated that the present disclosure can be implemented in various manners and should not be interpreted as being limited to the embodiments explained herein. On the contrary, the embodiments are provided to understand the present disclosure in a more thorough and complete way. It should be appreciated that drawings and embodiments of the present disclosure are provided only for the purpose of examples rather than limiting the protection scope of the present disclosure.

In the descriptions of the embodiments of the present disclosure, the term "includes" and its variants are to be read as open-ended terms that mean "includes, but is not limited to." The term "based on" is to be read as "based at least in part on." The term "one embodiment" or "this embodiment" is to be read as "at least one embodiment." The terms "first", "second" and so on can refer to same or different objects. The following text also can comprise other explicit and implicit definitions.

Principles of the present disclosure will now be described with reference to several example embodiments illustrated in the drawings. Although some preferred embodiments of the present disclosure are shown in the drawings, it would be appreciated that description of those embodiments is merely for the purpose of enabling those skilled in the art to better understand and further implement the present disclosure and is not intended for limiting the scope disclosed herein in any manner.

Most data start a long life cycle since their generation. As the data advance in their life cycle, capabilities of the data, such as access frequency and the like, will change. For example, the data, when created, are usually used frequently, i.e., number of reads/writes per unit of time is high. As time goes by, the number of accesses to the data decreases continuously. Fully automated storage tiering virtual pool (FAST VP) technology may dynamically match storage demands with changes of access frequency of data. For example, data with a high access frequency may be stored into a flash drive in an extremely high performance layer. When the access frequency of the data is at a normal level, the data may be moved to a serial attached SCSI (SAS) drive in a performance layer. However, when the access frequency of the data is low, the data may be further moved to a near line SAS (NL-SAS) drive in a capacity layer.

There are still many limitations in the traditional FAST VP technology. For example, the number of data movements is large. In addition, the traditional FAST VP technologies are restricted only to data movements between disk slices with the same IO heat and worn-out level. However, there are also many parameters related to the capability of the disk besides the IO heat and the worn-out level. A currently urgent and yet to be solved issue is how to implement tiered operations of the data in a disk by taking the parameters into account.

To solve the above issue, the present disclosure provides a solution for managing disks. In this solution, with statistics of one or more parameters of each disk slice in respective disks associated with actual usage (capability), a ratio of an upper limit of capability parameters of each disk to a sum of upper limits of capability parameters of all disks may be calculated. Taking this ratio as a baseline, the above ratio is compared with a ratio of an actual usage parameter of each disk to a sum of actual usage parameters of all disks, so as to determine whether each disk is utilized in a balanced and reasonable way. Besides, data in a relatively overused disk may be moved to a disk being used less, thereby achieving a balanced use among a plurality of disks in a multi-parameter dimension. Basic concepts of the present disclosure are first discussed below with reference to FIG. 1.

Figure 1:
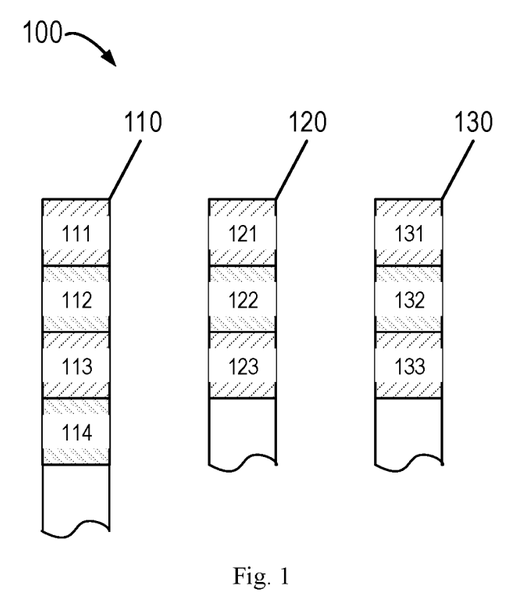
FIG. 1 illustrates a schematic diagram of an application scenario for managing disks in accordance with embodiments of the present disclosure.

FIG. 1 illustrates a schematic diagram of an application scenario 100 for managing disks in accordance with embodiments of the present disclosure. As shown in FIG. 1, storage disks 110, 120 and 130 are all used for storing data. In some embodiments, the storage disks 110, 120 and 130 are used for storing different types of data. As an example, the storage disks 110, 120 and 130 may separately be a flash drive (including NVMe Flash and SAS Flash), a serial attached SCSI (SAS) drive and a near line SAS (NL-SAS) drive.

For example, in a storage system based on redundant array of independent disks (RAID), physical storage disks may be organized with various RAID algorithms. To have a better understanding of the storage system, FIG. 1 shows the application scenario 100 of the storage system. As shown in FIG. 1, a storage disk 142 is divided into a plurality of storage blocks. These storage blocks are also known as a plurality of disk extents or disk slices. As shown in FIG. 1, the storage disk 110 may at least include disk slices 111, 112, 113 and 114; the storage disk 120 may at least include disk slices 121, 122 and 123; and the storage disk 130 may at least include disk slices 131, 132 and 133. This storage disk division manner may be a logical division. The size of each disk slice depends on the size of the storage disk and the division manner. In some examples, the size of the disk slice may be at a gigabyte level. Of course, other sizes of disk slice are also feasible according to actual deployment requirements.

The storage system (not shown) may obtain related parameters of a plurality of storage disks under its management. For example, a predetermined capability parameter and an actual usage parameter of the storage disk 110 may be obtained. The predetermined capability parameter may be an upper limit of the capability parameter of the storage disk 110, e.g., an upper limit of capacity, an upper limit of heat (i.e., number of reads/writes per unit of time), or an upper limit of worn-out level (i.e., a counting of write requests), etc. Moreover, the actual usage parameter may be parameters of the storage disk 110 such as a use capacity, a use heat or a use worn-out level, etc. It should be appreciated that the predetermined capability parameter of the storage disk 110 may be preset while the actual usage parameter of the storage disk 110 should be a sum of individual capability parameters of the disk slices 111, 112, 113 and 114 in the storage disk 110. Accordingly, the actual usage parameter of the storage disk 110 may be determined by summing the individual capability parameters of the disk slices 111, 112, 113 and 114. It is to be understood that the individual capability parameter of each slice is the individual usage parameter of each slice.

Similarly, a predetermined capability parameter and an actual usage parameter of the storage disk 120 may also be obtained. The predetermined capability parameter of the storage disk 120 may be preset while the actual usage parameter of the storage disk 120 should be a sum of individual capability parameters of the disk slices 121, 122 and 123 in the storage disk 120. Accordingly, the actual usage parameter of the storage disk 120 may be determined by summing the individual capability parameters of the disk slices 121, 122 and 123.

Similarly, a predetermined capability parameter and an actual usage parameter of the storage disk 130 may also be obtained. The predetermined capability parameter of the storage disk 130 may be preset while the actual usage parameter of the storage disk 130 should be a sum of individual capability parameters of the disk slices 131, 132 and 133 in the storage disk 130. Accordingly, the actual usage parameter of the storage disk 130 may be determined by summing the individual capability parameters of the disk slices 131, 132 and 133.

When the above parameters of each storage disk and each disk slice in the application scenario 100 are determined, reference capability parameters and used capability parameters of the respective storage disks may be further decided. The reference capability parameter may be normalized. For example, the reference capability parameter may be a ratio of the predetermined capability parameter of each storage disk to a sum of the predetermined capability parameters of the respective disks or be related to the ratio. Furthermore, the used capability parameter may be normalized. For example, the used capability parameter may be a ratio of the actual usage parameter of each storage disk to a sum of the actual usage parameters of the respective storage disks or be related to the ratio.

When the reference capability parameters and the used capability parameters of the respective storage disks are determined, the reference capability parameters of respective storage disk are separately compared with the respective used capability parameters. If the used capability parameter exceeds the reference capability parameter, it means that the storage disk has been "overused", thereby data in one or more disk slices of the storage disk may accordingly be moved to other storage disks that are not overused. For example, a part of the metadata in an "overused" storage disk may firstly be moved into an intermediate memory, which may be a memory list of a temporary memory, and then the metadata in the intermediate memory may be moved to at least one of the storage disks. As an example, the metadata in the intermediate memory are marked and moved to at least one of the storage disks. Then, the metadata in the intermediate memory may be moved to at least one of all the storage disks. As an example, the metadata in the intermediate memory may be marked as being moved to at least one of all of the storage disks. After the metadata are all marked, an operation is executed to move the real data corresponding to the marked metadata to a marked target disk in the storage disks. As another example, before the operation of moving the data from the intermediate memory to the storage disk, the storage system may traverse all movement patterns and calculate the results of these movement patterns. The storage system selects, from the results, a result in which the used capability parameters of the respective storage disks are closest to the reference capability parameters and performs the movement operation based on the selected result. In this way, balanced operations for the respective storage disks may be realized.

Embodiments of managing the storage disks 110, 120 and 130 have been described above with reference to FIG. 1. The above examples are provided only for explaining the present disclosure without suggesting any restrictions. A flowchart of a process of managing disks is described in details below with reference to FIG. 2.

Figure 2:
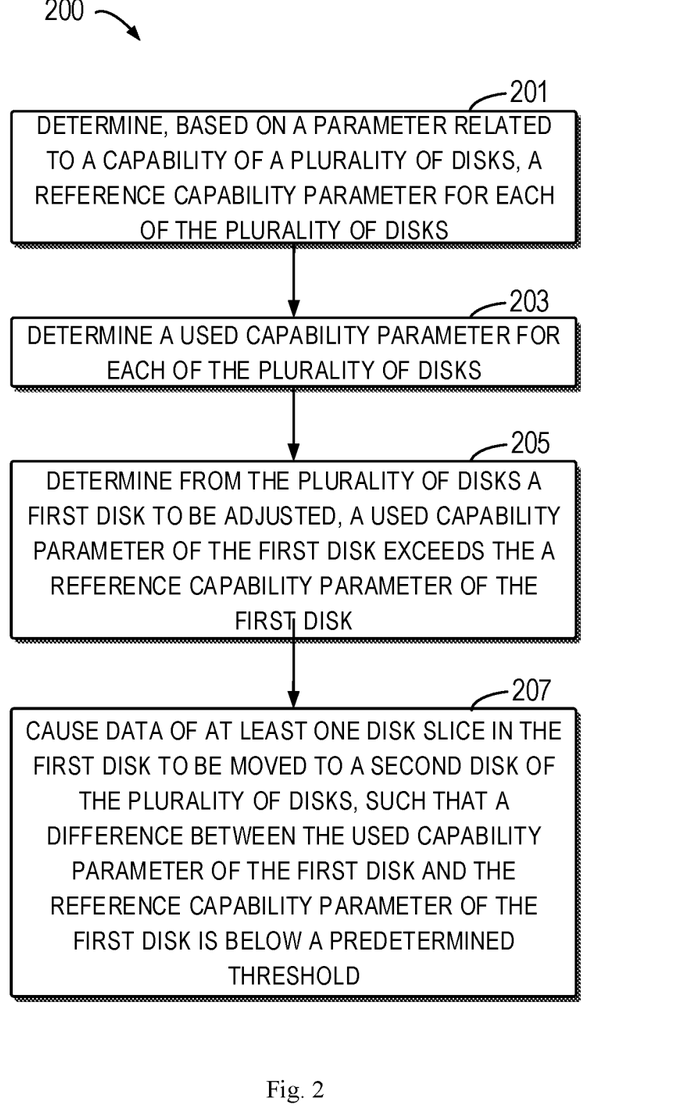
FIG. 2 illustrates a flowchart of a process of managing disks in accordance with embodiments of the present disclosure.

FIG. 2 illustrates a flowchart of a process 200 of managing the disks in accordance with embodiments of the present disclosure. In some embodiments, the method 200 may be implemented in the device shown by FIG. 7. As an example, the method 200 may be implemented in the application scenario 100 for managing the storage disks 110, 120 and 130 shown in FIG. 1. The process or method 200 of managing the disks in accordance with embodiments of the present disclosure is now described with reference to FIG. 1. To facilitate understanding, specific data mentioned in the following text are by way of example and are not intended to restrict the protection scope of the present disclosure.

At 201, the storage system may determine, based on parameters related to capability of a plurality of storage disks (such as storage disks 110, 120 and 130), reference capability parameters for each of the disks. In some embodiments, the reference capability parameters may be determined through the following process.

First of all, the predetermined capability parameter of each one of the storage disks 110, 120 and 130 may be determined. For example, the predetermined capability parameter may be an upper limit of the capability parameters of the storage disks 110, 120 and 130, e.g., an upper limit of the capacity, an upper limit of the heat (i.e., the number of reads/writes per unit of time), or an upper limit of the worn-out level (i.e., a counting of write requests), etc. The predetermined capability parameters of the storage disks 110, 120 and 130 may be preset. For example, the predetermined capability parameters of the storage disks 110, 120 and 130 may be D1, D2 and D3, respectively.

Then, a sum of the predetermined capability parameters of the storage disks 110, 120 and 130 may be determined as D1+D2+D3=Ds. Accordingly, the reference capability parameters of the storage disks 110, 120 and 130 may be respectively determined, in a normalized way, as a ratio of respective predetermined capability parameters to the sum, i.e., D1/Ds, D2/Ds and D3/Ds. In this way, proportions of respective storage tasks (for example, capacity, heat or upper limit of worn-out level, etc.) to be borne by the respective storage disks may be determined on the basis of the above parameters. If the data in the storage system can be stored at the level of the above reference capability parameters or at a level close to the above referenced capability parameters, then a balanced use among the plurality of disks can be achieved in a multi-parameter dimension.

Finally, the used capability parameter of each one of the storage disks 110, 120 and 130 can be determined at 203. In some embodiments, the used capability parameter may also be determined through the process below.

Firstly, the actual usage parameter of each one of the storage disks 110, 120 and 130 may be determined. For example, the actual usage parameters may be parameters of the storage disks 110, 120 and 130 such as use capacity, use heat or use worn-out level. As an example, the actual usage parameter of the storage disk 110 may be determined by summing the individual capability parameters of the disk slices 111, 112, 113 and 114.

Next, the sum of the actual usage parameters of the storage disks 110, 120 and 130 may be determined as U1+U2+U3=Us. Therefore, the used capability parameters of the storage disks 110, 120 and 130 may be respectively determined, in a normalized way, as a ratio of the respective actual usage parameters to the sum, i.e., U1/Us, U2/Us and U3/Us. In this way, proportions of respective storage tasks (for example, capacity, heat or upper limit of the worn-out level, etc.) to be borne by the respective storage disks may be determined on the basis of the above parameters.

At 205, storage disks to be adjusted may be determined from the storage disks 110, 120 and 130. The condition that a storage disk to be adjusted needs to fulfill is that: its used capability parameter exceeds the reference capability parameter. As an example, assuming that the used capability parameter U1/Us of the storage disk 110 exceeds the reference capability parameter D1/Ds and the used capability parameter U2/Us of the storage disk 120 exceeds the reference capability parameter D2/Ds. Thus, the storage disks 110 and 120 can be determined as the storage disks to be adjusted.

Both the used capability parameters and the reference capability parameters described above are determined in the form of a normalized proportion. Alternatively or additionally, the used capability parameters and the reference capability parameters may also be determined in the form of a difference between the actual usage parameters and the predetermined capability parameters of the respective storage disks, so as to determine one or more storage disks that have been "overused."

At 207, the data of at least one of the disk slices 111, 112, 113 and 114 in the storage disk 110 to be adjusted is caused to move to one of the storage disks 110, 120 and 130 (including the original storage disk 110), such that a difference between the used capability parameter U1/Us and the reference capability parameter D1/Ds of the updated storage disk 110 is below a predetermined threshold. As an example, the used capability parameter U1/Us of the updated storage disk 110 may be below or equal to the reference capability parameter D1/Ds.

Likewise, the data of at least one of the disk slices 121, 122 and 123 in the storage disk 120 to be adjusted is caused to move to one of the storage disks 110, 120 and 130 (including the original storage disk 120), such that a difference between the used capability parameter U2/Us and the reference capability parameter D2/Ds of the updated storage disk 120 is below a predetermined threshold. As an example, the used capability parameter U2/Us of the updated storage disk 120 may be below or equal to the reference capability parameter D2/Ds. It is to be understood that the aim of this movement (adjustment) operation is to have the used capability parameters of the respective storage disks close to the reference capability parameters. In this way, the balanced use among a plurality of disks can be achieved.

Figure 3:
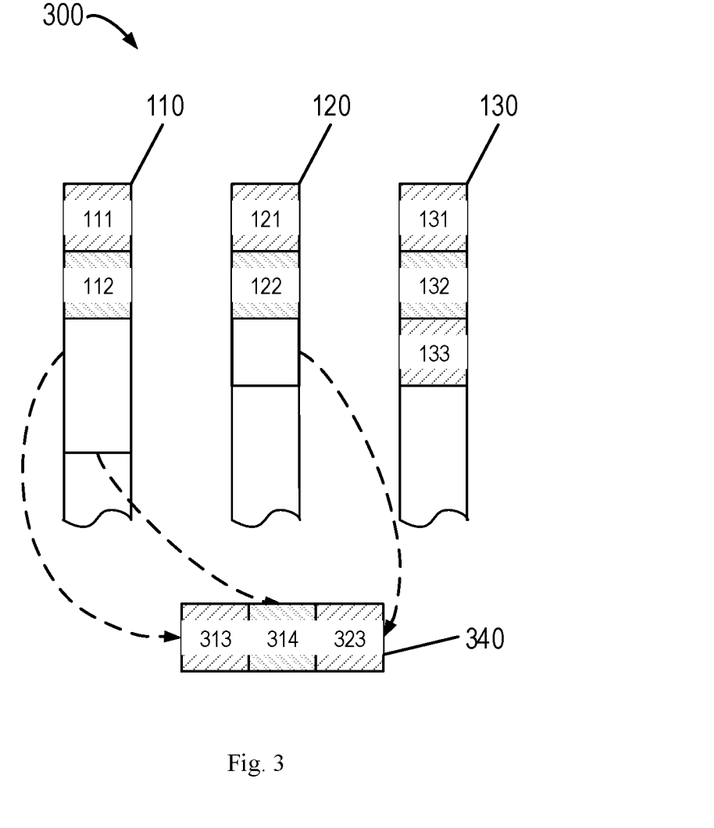
FIG. 3 illustrates a schematic diagram of an application scenario for moving data in accordance with embodiments of the present disclosure.

To optimize the performance of the solution of the present disclosure, embodiments of the present disclosure are described in detail below with reference to FIG. 3. FIG. 3 illustrates a schematic diagram of an application scenario 300 of moving data in accordance with embodiments of the present disclosure.

Similar to FIG. 1, the storage disks 110, 120 and 130 of FIG. 3 are all used for storing data. In addition, as shown in FIG. 3, the storage disk 110 may at least include disk slices 111 and 112; the storage disk 120 may at least include disk slices 121 and 122; and the storage disk 130 may at least include disk slices 131, 132 and 133. Distinguished from FIG. 1, metadata previously stored in the disk slices 113, 114 and 123 are all moved to an intermediate memory 340 and are stored respectively in areas 313, 314 and 323 of the intermediate memory 340.

Preferred implementations for managing the storage disks 110, 120 and 130 are described above with reference to FIG. 3. The above examples are provided merely for illustrating the present disclosure, without limiting the protection scope of it. A flow chart of a process of managing the disks is elaborated below with reference to FIGS. 4-6.

Figure 4:
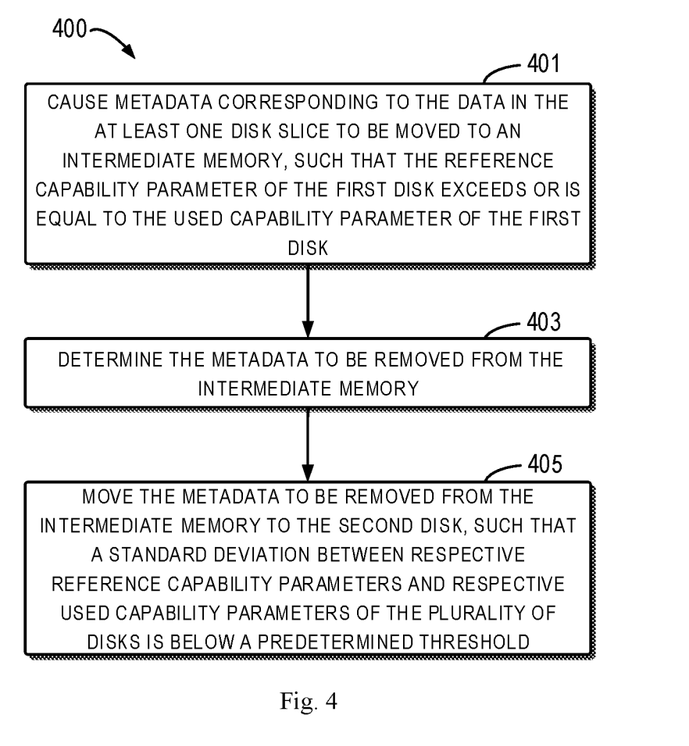
FIG. 4 illustrates a flowchart of a process of moving data in accordance with embodiments of the present disclosure.

FIG. 4 illustrates a flow chart of a process 400 of moving data in accordance with embodiments of the present disclosure. In some embodiments, the method 400 may be implemented in the device shown by FIG. 7. As an example, the method 400 may be implemented in the application scenario 300 for managing the storage disks 110, 120 and 130 shown by FIG. 3. The process or method 400 of managing the disks in accordance with embodiments of the present disclosure is now described with reference to FIG. 3. To facilitate understanding, the specific data mentioned in the following text are all by way of example and are not intended for restricting the protection scope of the present disclosure.

At 401, metadata of at least one disk slice of the disk slices 113 and 114 in the above storage disk 110 is caused to move to the intermediate memory 340, such that the reference capability parameter D1/Ds of the storage disk 110 exceeds or is equal to the used capability parameter U1/Us. Similarly, metadata of the disk slice 123 in the above storage disk 120 is caused to move to the intermediate memory 340, such that the reference capability parameter D2/Ds of the storage disk 120 exceeds or is equal to the used capability parameter U2/Us. Accordingly, the metadata of the disk slices 113 and 114 in the storage disk 110 and the metadata of the disk slice 123 in the storage disk 120 are moved respectively to positions 313, 314 and 323 in the intermediate memory 340.

It should be appreciated that the aforementioned "movement" operation may be a copy operation. In other words, after the above metadata is to the positions 313, 314 and 323 in the intermediate memory 340, the disk slices 113 and 114 in the storage disk 110 and the disk slice 123 in the storage disk 120, without being released, still can store respective data until a final (meanwhile should also be an optimal) movement result is determined. Therefore, the "real" movement of the data in the storage system is in fact performed after the determination of the final movement result. In this way, the number of movements may be reduced significantly and the system resources are saved.

Now return to FIG. 4. The metadata to be removed from the intermediate memory 340 may be determined at 403. Here, the metadata to be removed may be the metadata which is to be moved to respective storage disks from the intermediate memory 340 and to be removed from the original storage disk. Of course, if the target storage disk of the metadata conform to its original storage disk, then it is unnecessary to remove the metadata and also unnecessary to perform any movement operation on the data corresponding to the metadata.

At 405, the metadata to be removed may be caused to move from the intermediate memory 340 to a second disk (i.e., one of the storage disks 110, 120 and 130), such that a standard deviation between the respective reference capability parameters and the respective used capability parameters of the storage disks 110, 120 and 130 is below a predetermined threshold. In some embodiments, a result of the data movement may minimize the standard deviation between the respective reference capability parameters and the respective used capability parameters of the storage disks 110, 120 and 130. It is to be understood that the movement (adjustment) in this operation is intended for bringing the used capability parameters of the respective storage disks close to the reference capability parameters. In this way, the balanced use among a plurality of disks can be achieved.

Figure 5:
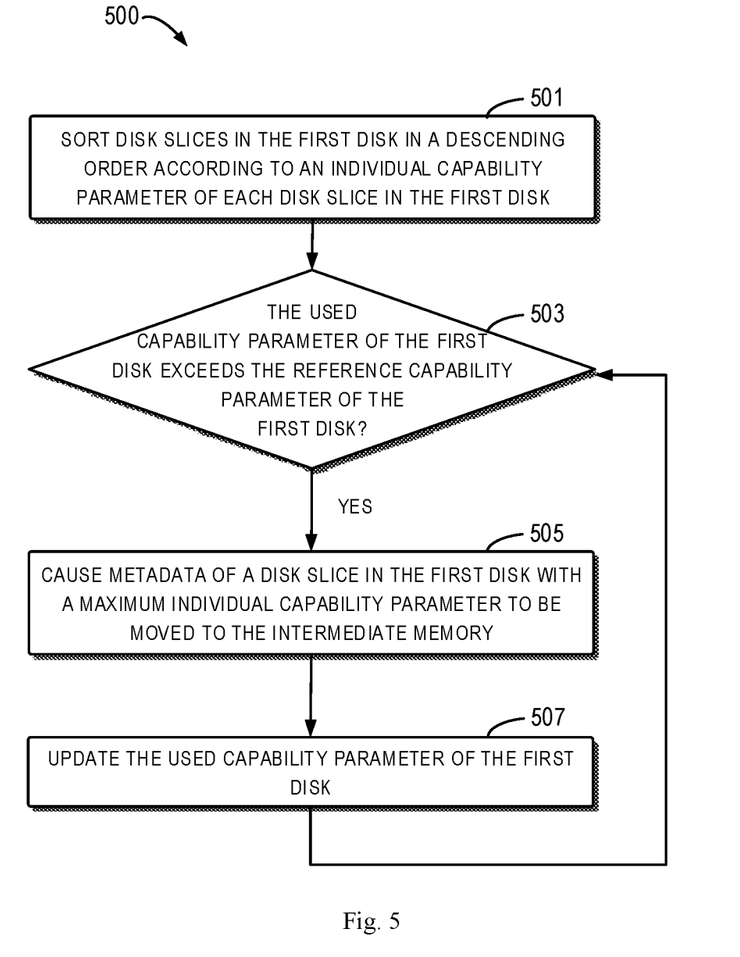
FIG. 5 illustrates a flowchart of a process of moving metadata to an intermediate memory in accordance with embodiments of the present disclosure.

In some embodiments, the metadata movement from the storage disk to the intermediate memory 340 can also be performed according to FIG. 5.

FIG. 5 illustrates a detailed flow chart of a process 500 of moving the metadata to the intermediate memory 340 in accordance with embodiments of the present disclosure. In some embodiments, the method 500 may be implemented in the device shown by FIG. 7. As an example, the method 500 may be implemented in the application scenario 300 for managing the storage disks 110, 120 and 130 shown by FIG. 3. The process or method 500 of managing the disks in accordance with embodiments of the present disclosure is now described with reference to FIG. 3. To facilitate understanding, the specific data mentioned in the following text are all by way of example, without limiting the protection scope of the present disclosure.

At 501, disk slices in the storage disk 110 may be sorted in a descending order according to individual capability parameter of each disk slice in the storage disk 110. For example, there is a certain size relation among the respective disk slices in the storage disk 110. According to this size relation, the respective disk slices in the storage disk 110 are sorted in a descending order as: disk slice 113, disk slice 114, disk slice 112 and disk slice 111. Similarly, based on the above assumption, disk slices in the storage disk 120 may be sorted in a descending order according to the individual capability parameter of each disk slice in the storage disk 120. For example, there is a certain size relation among the respective disk slices in the storage disk 120. According to this size relation, the respective disk slices in the storage disk 120 are sorted in a descending order as: disk slice 123, disk slice 122 and disk slice 121.

In some embodiments, to achieve a balanced use among a plurality of disks in a multi-parameter dimension, it is required to consider comprehensively a scenario with various capability parameters. Particularly, since the various capability parameters may differ from one another, their sorting manners (e.g., in a descending order) are also different. Therefore, it is required to consider more than two sorting manners for the capability parameters.

Figure 6:
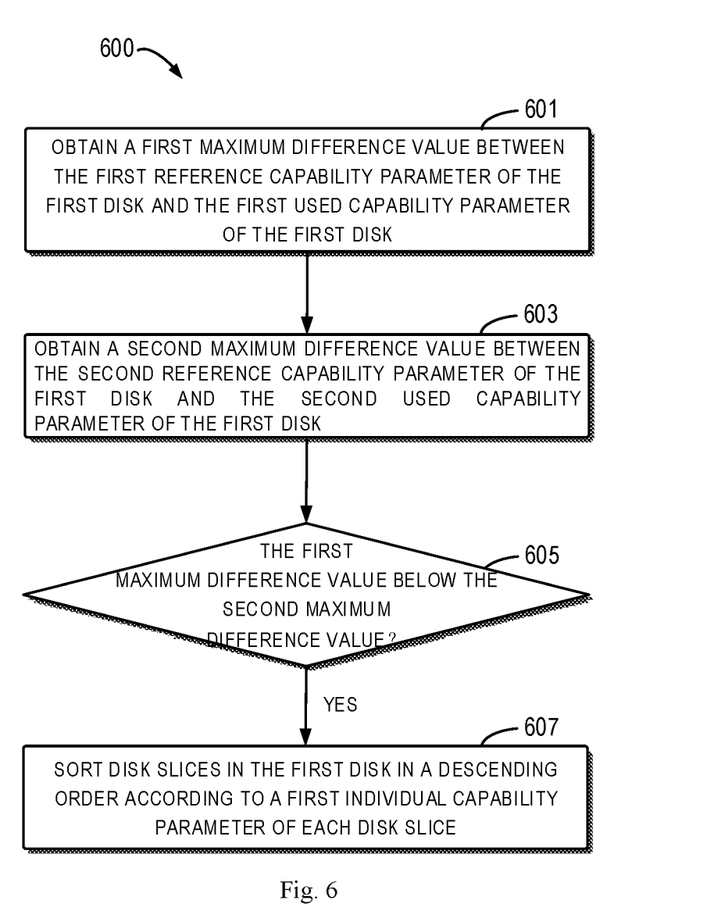
FIG. 6 illustrates a flowchart of a process of sorting disk slices in a descending order in accordance with embodiments of the present disclosure.

FIG. 6 illustrates a flow chart of a process 600 of sorting the disk slices in a descending order in accordance with embodiments of the present disclosure. In some embodiments, the method 600 may be implemented in the device shown by FIG. 7. As an example, the method 600 may be implemented in the application scenario 300 for managing the storage disks 110, 120 and 130 shown by FIG. 3. The process or method 600 for managing the disks in accordance with embodiments of the present disclosure is now described with reference to FIG. 3. To facilitate understanding, the specific data mentioned in the following text are all by way of example without limiting the protection scope of the present disclosure.

As shown in FIG. 6, the reference capability parameters may at least include a first and a second reference capability parameters and the used capability parameters may at least include a first used capability parameter and a second used capability parameter. Taking the storage disk 110 as an example, a first maximum difference value between the first reference capability parameter and the first used capability parameter of the storage disk 110 may be obtained at 601. It should be understood that "first maximum difference value" herein is interpreted as an absolute value from the first reference capability parameter subtracting the first used capability parameter. The first reference capability parameter is used for characterizing (or identifying), in a normalized way, a reference capability parameter for one of capacity, heat and upper limit of the worn-out level of the storage disk 110. The first used capability parameter is used for characterizing, in a normalized way, a used capability parameter for one of capacity, heat and upper limit of the worn-out level of the storage disk 110. It should be appreciated that the embodiments with two of capacity, heat and upper limit of the worn-out level described herein are by way of example only. The present disclosure is still applicable to a case in which three or more parameters are involved.

A second maximum difference value between the second reference capability parameter and the second used capability parameter of the storage disk 110 may be obtained at 603. It should be understood that "second maximum difference value" herein should be interpreted as an absolute value from the second reference capability parameter subtracting the second used capability parameter. The second reference capability parameter is used for characterizing, in a normalized way, a reference capability parameter for another one of capacity, heat and upper limit of the worn-out level of the storage disk 110. The second used capability parameter is provided for characterizing, in a normalized way, a used capability parameter for another one of capacity, heat and upper limit of the worn-out level of the storage disk 110.

The first maximum difference value is compared with the second maximum difference value at 605. If the first maximum difference value is below the second maximum difference value, then the method/process proceeds to 607. At 607, the disk slices in the storage disk 110 are sorted in a descending order according to a first individual capability parameter of each disk slice. In other words, the present disclosure preferentially sorts the used parameter values which exceed more over the reference parameter values than others. It should be appreciated that the data in the respective disk slices are moved one by one after the sorting. Alternatively or additionally, every time the data of one disk slice has been moved, the used parameter values which exceed more over the reference parameter values than others are searched again and the resultant parameters are kept on sorting. Therefore, a balanced use among a plurality of disks can be achieved in a multi-parameter dimension.

Returning to FIG. 5, when the sorting is completed, the following steps may be performed iteratively.

At 503, whether the used capability parameter U1/Us of the storage disk 110 exceeds the reference capability parameter D1/Ds of the storage disk 110 may be determined. If yes, the process 500 proceeds to 505, at which 505 the metadata in the disk slice 113 of the storage disk 110 having the maximum individual capability parameter are moved to the intermediate memory 340. Similarly, whether the used capability parameter U2/Us of the storage disk 120 exceeds the reference capability parameter D2/Ds of the storage disk 120 may be determined may be determined. If yes, the metadata in the disk slice 123 of the storage disk 120 with the maximum individual capability parameter are moved to the intermediate memory 340 at 505.

At 507, the used capability parameters of the storage disk 110 or the storage disk 120 are updated and then iteratively returned to 503. As shown in FIG. 3, since the used capability parameter U1/Us of the updated storage disk 110 still exceeds the reference capability parameter D1/Ds of the storage disk 110, it is required to further move the metadata in the disk slice 114 of the storage disk 110 with the maximum individual capability parameter to the intermediate memory 340. Through the above iterative operation, a part of the data may be moved out of the storage disk 110 through the minimum number of movements until the used capability parameter U1/Us of the storage disk 110 is below or equal to the reference capability parameter D1/Ds of the storage disk 110.

In this way, the data in the disk slice with the maximum individual capability parameter may be directly moved, such that the used capability parameters of the storage disk are below or equal to the reference capability parameters of the storage disk after the minimum number of movements. It is certain that the above methods for moving the data in the disk slice are by ways of example only. Besides, any disk slice, such as the disk slice with the minimum individual capability parameter, may also be moved.

In some embodiments, the parameters related to the capability of the above storage disks 110, 120 and 130 may include at least one of the number of reads/writes per unit of time (IO heat), a counting of write requests (worn-out level) and capacity.

It should be understood that the calculation process of the present disclosure is performed within a memory without really moving the data. The data moved in the memory is metadata (hardware ID, position, length, numbers of reads/writes) of the disk slices. After the calculation is completed, the data corresponding to the metadata is directly moved from the first disk to the second disk (including copy data and removed data).

By implementing the plurality of embodiments above, a ratio of an upper limit of the capability parameter of each disk to a sum of upper limits of the capability parameters of all disks may be determined. Taking the above ratio as a reference, a ratio of an actual usage parameter of each disk to a sum of actual usage parameters of all disks may further be determined. The ratio is compared with the reference, then whether each disk is utilized in a balanced and reasonable way may be determined. Besides, data in the relatively overused disks is moved to disks with less usage, thereby achieving a balanced use among a plurality of disks in a multi-parameter dimension. Furthermore, when the parameters of the above reference are determined, a solution, in which a variance or a standard deviation between the actual usage parameters and the reference is minimal, may be found from a plurality of alternative data movement solutions and the solution is fulfilled via a one-off movement operation. Hence, the number of data movements in the disk balancing process is minimal.

Figure 7:
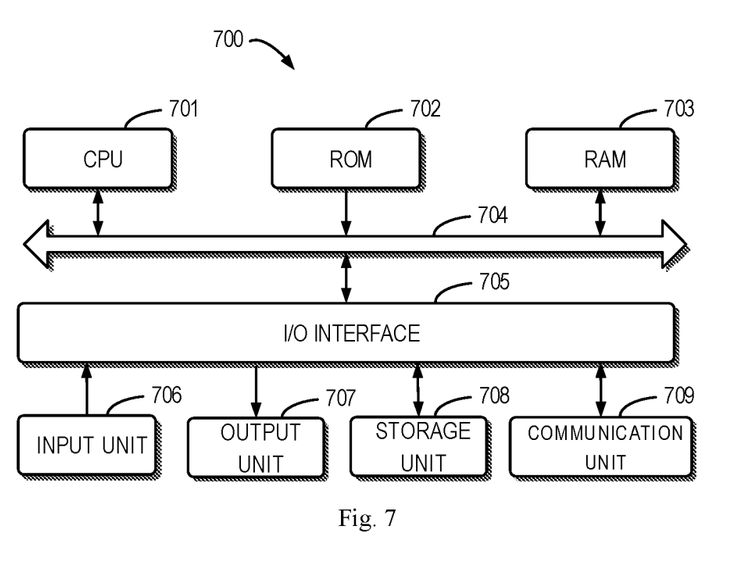
FIG. 7 illustrates a schematic diagram of an example device suitable for implementing embodiments of the present disclosure.

FIG. 7 illustrates a schematic block diagram of an example device 700 for implementing embodiments of the present disclosure. As shown, the device 700 includes a central processing unit (CPU) 701, which can execute various suitable actions and processing based on the computer program instructions stored in a read-only memory (ROM) 702 or computer program instructions loaded in a random-access memory (RAM) 703 from a storage unit 708. The RAM 703 may also store all kinds of programs and data required by the operations of the device 700. The CPU 701, ROM 702 and RAM 703 are connected to each other via a bus 704. An input/output (I/O) interface 705 is also connected to the bus 704.

A plurality of components in the device 700 is connected to the I/O interface 705, including: an input unit 706, such as a keyboard, a mouse and the like; an output unit 707, e.g., various kinds of displays and loudspeakers, etc.; a storage unit 708, such as a disk and an optical disk, etc.; and a communication unit 709, such as a network card, a modem, a wireless transceiver and the like. The communication unit 709 allows the device 700 to exchange information/data with other devices via the computer network, such as Internet, and/or various telecommunication networks.

Each of the above described process and processing, such as the process 200, 400, 500 and/or 600, may be executed by the processing unit 701. For example, in some embodiments, the processes 200, 400, 500 and/or 600 may be implemented as a computer software program tangibly included in the machine-readable medium, e.g., storage unit 708. In some embodiments, the computer program can be partially or fully loaded and/or mounted to the device 700 via the ROM 702 and/or communication unit 709. When the computer program is loaded to the RAM 703 and executed by the CPU 701, one or more steps or acts of the above described process 200, 400, 500 and/or 600 can be implemented.

The present disclosure may be a method, an apparatus, a system and/or a computer program product. The computer program product may include a computer-readable storage medium, on which the computer-readable program instructions for executing various aspects of the present disclosure are loaded.

The computer-readable storage medium may be a tangible apparatus that maintains and stores instructions utilized by the instruction executing apparatuses. The computer-readable storage medium can be, but not limited to, an electrical storage device, a magnetic storage device, an optical storage device, an electromagnetic storage device, a semiconductor storage device or any appropriate combinations of the above. More concrete examples of the computer-readable storage medium (non-exhaustive list) include: a portable computer disk, a hard disk, a random-access memory (RAM), a read-only memory (ROM), an erasable programmable read-only memory (EPROM or flash), a static random-access memory (SRAM), portable compact disk read-only memory (CD-ROM), digital versatile disk (DVD), a memory stick, a floppy disk, a mechanical coding device, a punched card stored with instructions thereon, or a projection in a slot, and any appropriate combinations of the above. The computer-readable storage medium utilized herein is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction herein may be downloaded from the computer-readable storage medium to each computing/processing device, or to an external computer or external storage via Internet, a local area network, a wide area network and/or a wireless network. The network may include a copper-transmitted cable, an optical fiber transmission, a wireless transmission, a router, firewall, a switch, a network gate computer and/or an edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure may be assembly instructions, instructions of instruction set architecture (ISA), machine instructions, machine-related instructions, microcodes, firmware instructions, state setting data, or source codes or target codes written in any combinations of one or more programming languages, where the programming languages consist of object-oriented programming languages (such as Smalltalk and C++, etc.) and traditional procedural programming languages, e.g., "C" language or similar programming languages. The computer-readable program instructions may be implemented fully on the user computer, partially on the user computer, as an independent software package, partially on the user computer and partially on the remote computer, or completely on the remote computer or server. In the case in which remote computer is involved, the remote computer may be connected to the user computer via any type of networks, including a local area network (LAN) and a wide area network (WAN), or to an external computer (e.g., connected via Internet with an Internet service provider). In some embodiments, state information of the computer-readable program instructions is used to customize an electronic circuit, e.g., a programmable logic circuit, a field programmable gate array (FPGA) or a programmable logic array (PLA). The electronic circuit may execute computer-readable program instructions to implement various aspects of the present disclosure.

Various aspects of the present disclosure are described here with reference to a flow chart and/or block diagram of a method, apparatus (system) and computer program products according to embodiments of the present disclosure. It should be understood that each block of the flow chart and/or block diagram and the combination of various blocks in the flow chart and/or block diagram can be implemented by computer-readable program instructions.

The computer-readable program instructions can be provided to a processing unit of a general-purpose computer, a dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions may also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions may also be loaded into computer, other programmable data processing apparatuses or other devices, so as to execute a series of operation steps on the computer, other programmable data processing apparatuses or other devices to generate a computer-implemented process. Therefore, the instructions executed on the computer, other programmable data processing apparatuses or other devices implement functions/actions stipulated in one or more blocks of the flow chart and/or block diagram.

The flow chart and block diagram in the drawings illustrate system architectures, functions and operations that may be implemented by a system, a method and a computer program product according to multiple implementations of the present disclosure. In this regard, each block in the flow chart or block diagram can represent a module, a part of program segment or code, where the module and the part of program segment or code include one or more executable instructions for performing stipulated logic functions. In some alternative implementations, it should be noted that the functions indicated in the block can also take place in an order different from the one indicated in the drawings. For example, two successive blocks may be in fact executed in parallel or sometimes in a reverse order dependent on the involved functions. It should also be noted that each block in the block diagram and/or flow chart and combinations of the blocks in the block diagram and/or flow chart may be implemented by a hardware-based system exclusive for executing stipulated functions or actions, or by a combination of dedicated hardware and computer instructions.

Various implementations of the present disclosure have been described above and the above description is only by way of example rather than exhaustive and is not limited to the embodiments of the present disclosure. Many modifications and alterations, without deviating from the scope and spirit of the explained various embodiments, are obvious for those skilled in the art. The selection of terms in the text aims to best explain principles and actual applications of each embodiment and technical improvements made in the market by each embodiment, or enable others of ordinary skill in the art to understand respective embodiments of the present disclosure.

We claim:

1. A method of managing disks, comprising:
determining, based on a parameter related to a capability of a plurality of disks, a reference capability parameter for each of the plurality of disks;
determining a used capability parameter for each of the plurality of disks;
determining from the plurality of disks a first disk to be adjusted, a used capability parameter of the first disk exceeds a reference capability parameter of the first disk; and
causing data of at least one disk slice in the first disk to be moved to a second disk of the plurality of disks, such that a difference between the used capability parameter of the first disk and the reference capability parameter of the first disk is below a predetermined threshold;
wherein causing the data of the at least one disk slice in the first disk to be moved to the second disk comprises:
causing metadata corresponding to the data in the at least one disk slice to be moved to an intermediate memory, such that the reference capability parameter of the first disk exceeds or is equal to the used capability parameter of the first disk;
determining the metadata to be removed from the intermediate memory; and
moving the metadata to be removed from the intermediate memory to the second disk, such that a standard deviation between respective reference capability parameters and respective used capability parameters of the plurality of disks is below a predetermined threshold.

2. The method of claim 1, wherein determining the reference capability parameter comprises:
determining a predetermined capability parameter of each of the plurality of disks;
determining a sum of predetermined capability parameters of the plurality of disks; and
determining the reference capability parameter as a ratio of the predetermined capability parameter to the sum.

3. The method of claim 1, wherein determining the used capability parameter comprises:
determining an actual usage parameter of each of the plurality of disks;
determining a sum of actual usage parameters of the plurality of disks; and
determining the used capability parameter as a ratio of the actual usage parameter to the sum.

4. The method of claim 1, wherein causing the metadata in the at least one disk slice to be moved to the intermediate memory comprises:
sorting disk slices in the first disk in a descending order according to an individual capability parameter of each disk slice in the first disk; and
performing iteratively the following steps:
in response to the used capability parameter of the first disk exceeding the reference capability parameter of the first disk, causing metadata of a disk slice in the first disk with a maximum individual capability parameter to be moved to the intermediate memory; and updating the used capability parameter of the first disk.

5. The method of claim 4, wherein the reference capability parameter at least comprises a first reference capability parameter and a second reference capability parameter, and the used capability parameter at least comprises a first used capability parameter and a second used capability parameter, wherein sorting disk slices in the first disk in a descending order comprises:

obtaining a first maximum difference value between the first reference capability parameter of the first disk and the first used capability parameter of the first disk;

obtaining a second maximum difference value between the second reference capability parameter for the first disk and the second used capability parameter of the first disk; and in response to the first maximum difference value being below the second maximum difference value, sorting disk slices in the first disk in a descending order according to a first individual capability parameter of each disk slice.

6. The method of claim 1, wherein the parameter related to the capability of the plurality of disks comprises at least one of:

a number of reads/writes per unit of time,
a counting of write requests, and
a capacity.

7. An electronic device, comprising:

a processor; and a memory storing computer program instructions, the processor running the computer program instructions in the memory to control the electronic device to perform acts comprising:

determining, based on a parameter related to a capability of a plurality of disks, a reference capability parameter for each of the plurality of disks;

determining a used capability parameter for each of the plurality of disks;

determining from the plurality of disks a first disk to be adjusted, a used capability parameter of the first disk exceeds a reference capability parameter of the first disk; and causing data of at least one disk slice in the first disk to be moved to a second disk of the plurality of disks, such that a difference between the used capability parameter of the first disk and the reference capability parameter of the first disk is below a predetermined threshold;

wherein causing the data of the at least one disk slice in the first disk to be moved to the second disk comprises:

causing metadata corresponding to the data in the at least one disk slice to be moved to an intermediate memory, such that the reference capability parameter of the first disk exceeds or equals to the used capability parameter of the first disk;

determining the metadata to be removed from the intermediate memory; and moving the metadata to be removed from the intermediate memory to the second disk, such that a standard deviation between respective reference capability parameters and respective used capability parameters of the plurality of disks is below a predetermined threshold.

8. The electronic device of claim 7, wherein determining the reference capability parameter comprises:

determining a predetermined capability parameter of each of the plurality of disks;

determining a sum of predetermined capability parameters of the plurality of disks; and determining the reference capability parameter as a ratio of the predetermined capability parameter to the sum.

9. The electronic device of claim 7, wherein determining the used capability parameter comprises:

determining an actual usage parameter of each of the plurality of disks;

determining a sum of actual usage parameters of the plurality of disks; and determining the used capability parameter as a ratio of the actual usage parameter to the sum.

10. The electronic device of claim 7, wherein causing the metadata in the at least one disk slice to be moved to the intermediate memory comprises:

sorting disk slices in the first disk in a descending order according to an individual capability parameter of each disk slice in the first disk; and performing iteratively the following steps:

in response to the used capability parameter of the first disk exceeding the reference capability parameter of the first disk, causing metadata of a disk slice in the first disk with a maximum individual capability parameter to be moved to the intermediate memory; and updating the used capability parameter of the first disk.

11. The electronic device of claim 10, wherein the reference capability parameter at least comprises a first reference capability parameter and a second reference capability parameter, and the used capability parameter at least comprises a first used capability parameter and a second used capability parameter, wherein sorting disk slices in the first disk in a descending order comprises:

obtaining a first maximum difference value between the first reference capability parameter of the first disk and the first used capability parameter of the first disk;

obtaining a second maximum difference value between the second reference capability parameter for the first disk and the second used capability parameter of the first disk; and in response to the first maximum difference value being below the second maximum difference value, sorting disk slices in the first disk in a descending order according to a first individual capability parameter of each disk slice.

12. The electronic device of claim 7, wherein the parameter related to the capability of the plurality of disks comprises at least one of:

a number of reads/writes per unit of time,
a counting of write requests, and
a capacity.

13. A computer program product having a non-transitory computer readable medium which stores a set of instructions to manage disks; the set of instructions, when carried out by computerized circuitry, causing the computerized circuitry to perform a method of:

determining, based on a parameter related to a capability of a plurality of disks, a reference capability parameter for each of the plurality of disks;

determining a used capability parameter for each of the plurality of disks;

determining from the plurality of disks a first disk to be adjusted, a used capability parameter of the first disk exceeds a reference capability parameter of the first disk; and causing data of at least one disk slice in the first disk to be moved to a second disk of the plurality of disks, such that a difference between the used capability parameter of the first disk and the reference capability parameter of the first disk is below a predetermined threshold;

wherein causing the data of the at least one disk slice in the first disk to be moved to the second disk comprises:

causing metadata corresponding to the data in the at least one disk slice to be moved to an intermediate memory, such that the reference capability parameter of the first disk exceeds or is equal to the used capability parameter of the first disk;

determining the metadata to be removed from the intermediate memory; and moving the metadata to be removed from the intermediate memory to the second disk, such that a standard deviation between respective reference capability parameters and respective used capability parameters of the plurality of disks is below a predetermined threshold.

14. The method of claim 1, wherein at least one of the plurality of disks is a flash drive and another of the plurality of disks is not a flash drive.

15. The electronic device of claim 7, wherein at least one of the plurality of disks is a flash drive and another of the plurality of disks is not a flash drive.

16. The computer program product of claim 13, wherein determining the reference capability parameter comprises:

determining a predetermined capability parameter of each of the plurality of disks;

determining a sum of predetermined capability parameters of the plurality of disks; and determining the reference capability parameter as a ratio of the predetermined capability parameter to the sum.

17. The computer program product of claim 13, wherein determining the used capability parameter comprises:

determining an actual usage parameter of each of the plurality of disks;

determining a sum of actual usage parameters of the plurality of disks; and determining the used capability parameter as a ratio of the actual usage parameter to the sum.

18. The computer program product of claim 13, wherein causing the metadata in the at least one disk slice to be moved to the intermediate memory comprises:

sorting disk slices in the first disk in a descending order according to an individual capability parameter of each disk slice in the first disk; and performing iteratively the following steps:

in response to the used capability parameter of the first disk exceeding the reference capability parameter of the first disk, causing metadata of a disk slice in the first disk with a maximum individual capability parameter to be moved to the intermediate memory; and updating the used capability parameter of the first disk.

19. The computer program product of claim 18, wherein the reference capability parameter at least comprises a first reference capability parameter and a second reference capability parameter, and the used capability parameter at least comprises a first used capability parameter and a second used capability parameter, wherein sorting disk slices in the first disk in a descending order comprises:

obtaining a first maximum difference value between the first reference capability parameter of the first disk and the first used capability parameter of the first disk;

obtaining a second maximum difference value between the second reference capability parameter for the first disk and the second used capability parameter of the first disk; and in response to the first maximum difference value being below the second maximum difference value, sorting disk slices in the first disk in a descending order according to a first individual capability parameter of each disk slice.

20. The computer program product of claim 13, wherein the parameter related to the capability of the plurality of disks comprises at least one of:

a number of reads/writes per unit of time, a counting of write requests, and a capacity.

* * * * *